(12) United States Patent
Saccardo

(10) Patent No.: US 6,962,105 B2
(45) Date of Patent: Nov. 8, 2005

(54) KITCHEN APPLIANCE FOR COOKING FOODS

(75) Inventor: Vanda Saccardo, San Giovanni Lupatoto (IT)

(73) Assignee: Aemme S.R.L., Verona (IT)

( * ) Notice: Subject to any disclaimer, the term of this patent is extended or adjusted under 35 U.S.C. 154(b) by 0 days.

(21) Appl. No.: 10/864,865

(22) Filed: Jun. 10, 2004

(65) Prior Publication Data

US 2005/0022675 A1 Feb. 3, 2005

(30) Foreign Application Priority Data

Jul. 13, 2003 (EP) .................................. 03425387

(51) Int. Cl.[7] .......................... A47J 27/00; A47J 37/00; A47J 37/12; A23L 1/00
(52) U.S. Cl. ............................. 99/330; 99/403; 99/407
(58) Field of Search .......................... 99/330, 331–333, 99/334, 341, 342, 352–355, 403–410, 416, 99/417, 426, 427, 483, 411–415, 444–450, 99/323.5, 485; 366/234; 426/523, 438

(56) References Cited

U.S. PATENT DOCUMENTS

| | | | | |
|---|---|---|---|---|
| 3,194,662 A | * | 7/1965 | Nelson | 126/389.1 |
| 3,618,587 A | * | 11/1971 | Lee, Sr. | 126/389.1 |
| 4,945,893 A | * | 8/1990 | Manchester | 126/391.1 |
| 4,968,516 A | * | 11/1990 | Thompson | 426/233 |
| 5,070,774 A | * | 12/1991 | Rosso et al. | 99/330 |
| 5,142,966 A | * | 9/1992 | Morandi et al. | 99/352 |
| 5,361,682 A | * | 11/1994 | Crolla | 99/352 |
| 5,586,487 A | * | 12/1996 | Marino | 99/330 |
| 6,269,808 B1 | * | 8/2001 | Murahashi | 126/391.1 |
| 6,360,652 B1 | * | 3/2002 | Cusenza et al. | 99/330 |
| 6,516,708 B2 | * | 2/2003 | Cusenza et al. | 99/330 |
| 6,523,457 B1 | * | 2/2003 | Ancona et al. | 99/330 |

* cited by examiner

Primary Examiner—Timothy F. Simone
(74) Attorney, Agent, or Firm—Browdy and Neimark, PLLC

(57) ABSTRACT

Kitchen furniture item for cooking foods, comprising a support structure having a lower support base, and a cooking device mounted in correspondence with an operative portion of the support structure. The cooking device comprises a cooking tank, a water inlet conduit and a drain conduit both connected to the tank. On the drain conduit is also mounted a first shut-off valve. The cooking device further comprises heating means operatively associated to the tank to heat its contents on command. The kitchen furniture item is also provided with at least a covering element associated to the support structure and movable from an open position in which it allows access to the cooking device, to a closed position in which it covers the cooking device at least superiorly and it defines a support plane superiorly to the kitchen furniture item.

20 Claims, 3 Drawing Sheets

KITCHEN APPLIANCE FOR COOKING FOODS

BACKGROUND OF THE INVENTION

1. Technical Field of the Invention

The present invention relates to a kitchen appliance for cooking foods formed as a base unit for use with other similarly sized base units in a kitchen.

In particular, the present invention is destined to be applied to home kitchens, and it is particularly advantageous in the case of modular kitchens.

The preferred field of application of the present invention is that of cooking foods by boiling, such as cooking pasta, whereto explicit reference shall be made hereinafter.

2. Prior Art

Nowadays, kitchen appliances usable for this purpose are those whereon is mounted a cooking range, which can be gas-fed or electrically powered.

Cooking by boiling is then achieved by filling a pot with water which is then set to be heated onto the cooking range.

However, this solution has some drawbacks when it become necessary to cook relatively large quantities of foods, as occurs for instance when a group of friends or relatives meet for dinner at someone's home.

The larger the quantity of food to cook, the larger is also the quantity of water that needs to be brought to a boil.

Oftentimes, however, pots of adequate size are not available in a normal home.

On the other hand, if an adequate pot is in fact available, oftentimes the cooking range is not adequate for it.

Consequently, it is necessary to wait a very long time before the water reaches the boiling point, hence enabling to pour the pasta into it.

Moreover, oftentimes there is no place available to store a bulky object like a large pot, which additionally is also very awkward to wash in a home sink or dishwasher.

SUMMARY OF THE INVENTION

In this situation the technical task constituting the basis of the present invention is to provide a kitchen appliance formed as a base unit for cooking foods for use with other similarly sized base units in a kitchen which overcomes the aforesaid drawbacks.

In particular a technical task of the present invention is to provide a kitchen furniture item for cooking foods which allows to complete the cooking process rapidly, in a manner that is substantially independent from the quantity of food.

Another technical task of the present invention is to provide a kitchen furniture item for cooking relatively large quantities of food which does not require bulky pots.

The specified technical task and the indicated aims are substantially achieved by a kitchen furniture item for cooking foods, as described in the accompanying claims.

BRIEF DESCRIPTION OF THE DRAWINGS

Further features and the advantages of the present invention shall become more readily apparent from the detailed description of some preferred, but not exclusive, embodiments of a kitchen furniture item for cooking foods, illustrated in the accompanying drawings, in which.

DESCRIPTION OF THE PREFERRED EMBODIMENT

Figure 1:
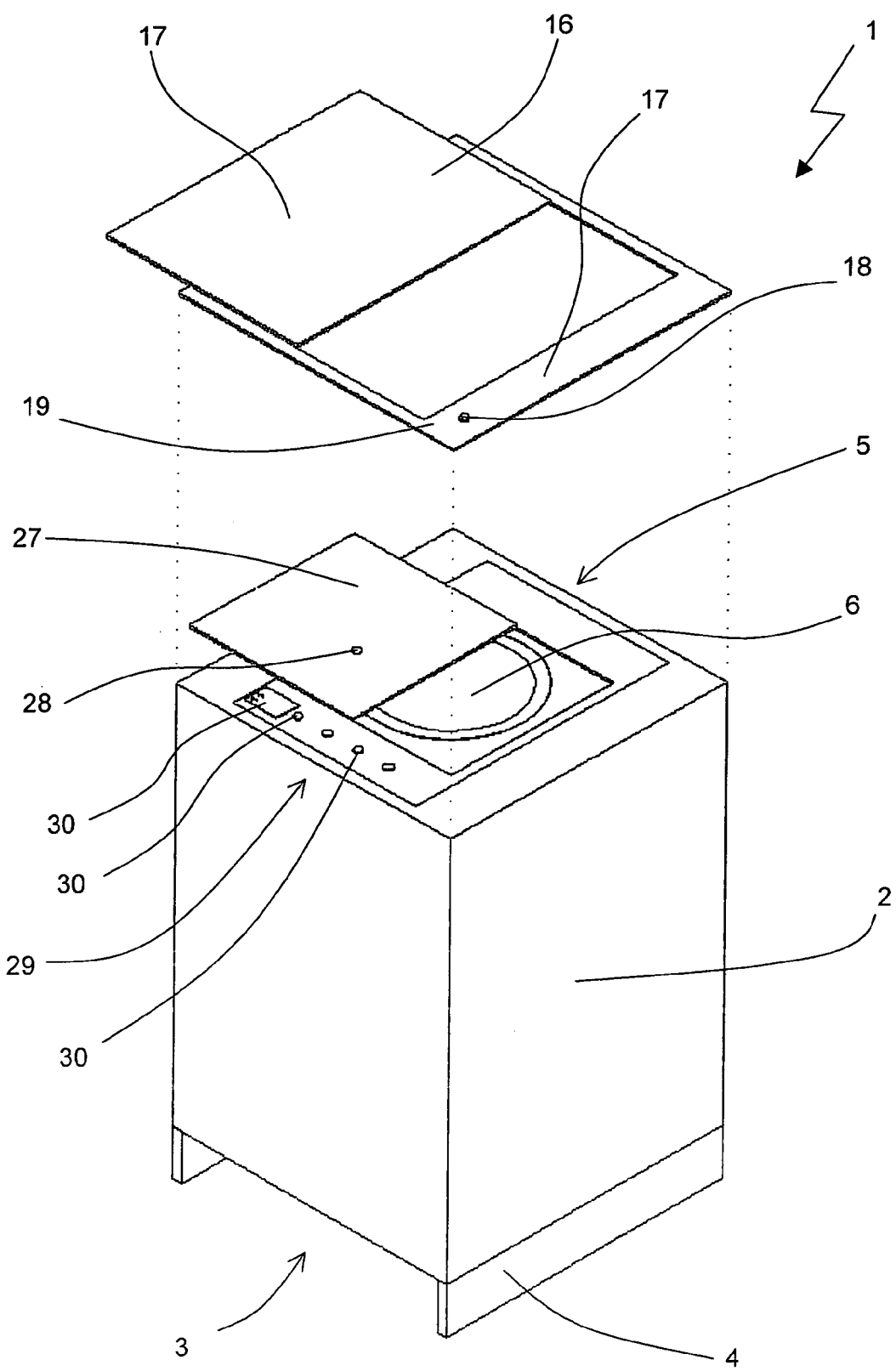
FIG. 1 shows a schematic, partially exploded axonometric view of a kitchen furniture item according to the present invention.
Figure 2:
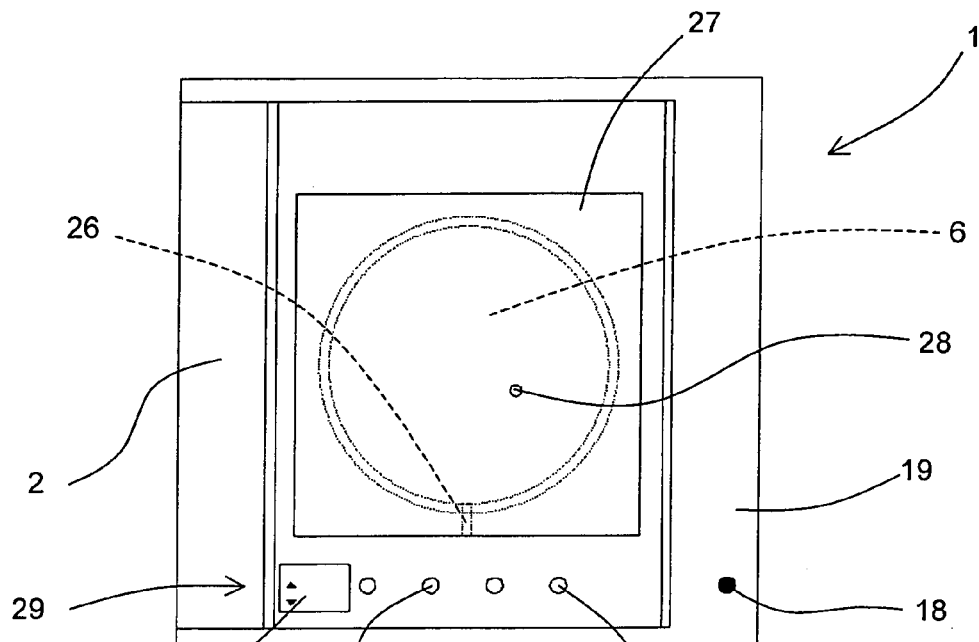
FIG. 2 shows a schematic top view, with some parts removed, of the furniture item of FIG. 1.

With reference to the aforementioned figures, the reference number 1 globally designates a kitchen furniture item for cooking foods, according to the present invention.

The kitchen furniture item 1 of the present invention comprises first of all a support structure 2 whose lower base 3 is destined to be set down onto the kitchen floor, and may have (FIGS. 1 and 3), or not have (FIGS. 4 and 5) a skirting board 4.

In correspondence with the upper operative portion of the support structure 2 is mounted a cooking device 5.

Said cooking device 5 comprises mainly a cooking tank 6 and heating means 7 operatively associated with the tank 6 to heat, on command, whatever is contained therein.

In addition, to the tank 6 are associated a drain conduit 8 and an inlet conduit 9.

The drain conduit 8 is connected to the bottom of the tank 6 by means of a first shut-off valve 10. The free end 11 of the drain conduit 8 can be connected, by means of a hydraulic union fitting 12, to a drain system. By exploiting the action of the first shut-off valve 10, it is therefore possible to discharge on command the contents of the tank 6 through the drain conduit 8.

Although not shown in the accompanying figures, the drain conduit 8 can also comprise a branch connected to the upper part of the tank 6 to prevent the tank 6 from overflowing.

The inlet conduit 9 has a first end 13 connectable to a water supply system and a second end 14 connected to the upper part of the tank 6 to pour water on command into the tank 6.

In the accompanying figures, in which the inlet conduit 9 is depicted only schematically, to the first end 13 of the inlet conduit 9 is associated a connecting element which can be constituted either by a simple hydraulic union fitting for connection to the water supply system, or by a second shut-off valve 15 able to regulate the flow of water in the inlet conduit 9. In this latter case, a solenoid valve is preferably provided.

Another important feature of the present invention is represented by the fact that the kitchen furniture item 1 further comprises at least a covering element 16 associated to the upper part of the support structure 2. Said covering element 16 is movable from an open position, in which it allows a user to access the cooking device 5, to a closed position in which it covers the cooking device 5 at least superiorly. When the covering element 16 is in the latter position, the kitchen furniture item 1 superiorly has a support plane 17 defined at least in part by the covering element 16 itself.

With the covering element 16 in the closed position, the kitchen furniture item 1 of the present invention is thus wholly similar to a traditional furniture item 1, whilst the cooking device 5 remains hidden from view.

Many embodiments of the covering element 16 can be provided, only some of which are shown in the accompanying tables.

According to a first type, the covering element 16 is associated in sliding fashion to the support structure 2 (FIG. 1) and can slide in a horizontal plane, laterally relative to the kitchen furniture item 1.

The covering element 16 can be actuated either manually, or, as shown in FIG. 1, by means of an appropriate control push-button 18 connected to appropriate actuation means (not shown).

Figure 5:
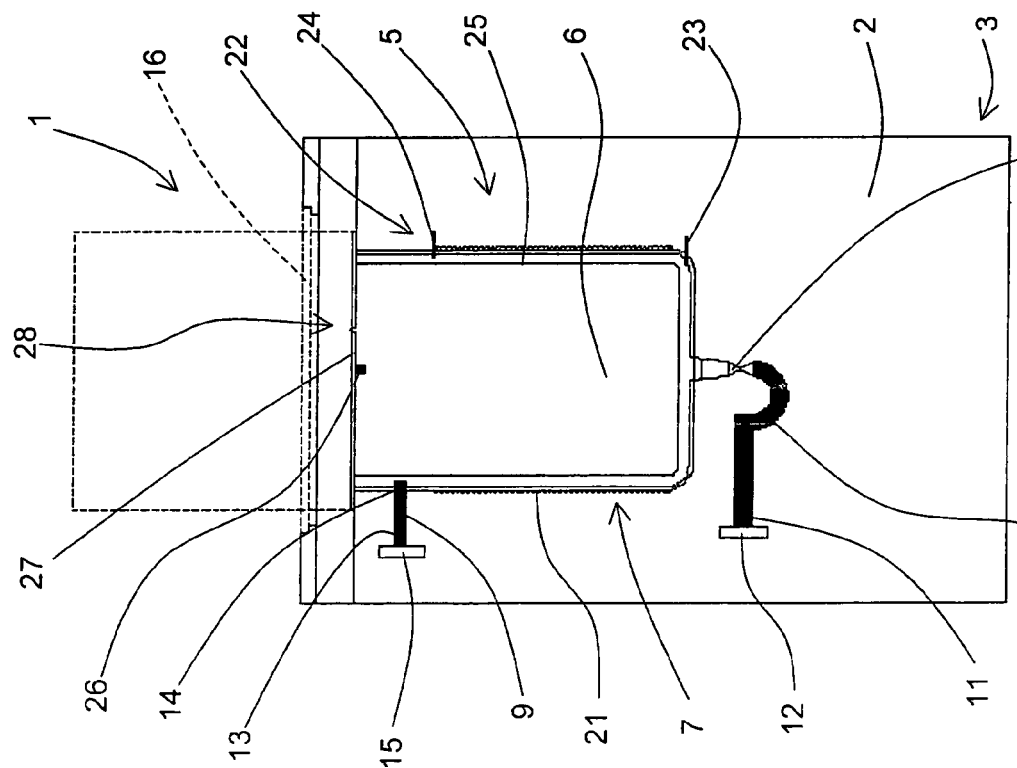
FIG. 5 shows a schematic front view, with some parts drawn in see-through mode and others removed, of a second variation of the kitchen furniture item obtained in accordance with the present invention.

According to the type shown in FIG. 5 instead, the covering element 16 is hinged to the support structure 2, and when it is in the open position it lies in a substantially vertical plane.

According to additional embodiments not illustrated herein, the covering element 16 can also be in the form of a roller shutter (for instance winding within the kitchen furniture item 1), of a bellows, or in yet other ways.

In the illustrated embodiments, lastly, the upper support plane 17 of the kitchen furniture item 1 is defined in part by the covering element 16 and in part by a U shaped planar portion 19 of the support structure 2.

According to the illustrated embodiments, the heating means 7 are constituted by one or more electrical plates 20, 21 associated to the cooking tank 6.

In other embodiments the heating means 7 can be also be constituted by a burner, for instance gas-fed, or, in more complex embodiments (since, at least, shielding elements will be required), a source of microwaves.

Figure 3:
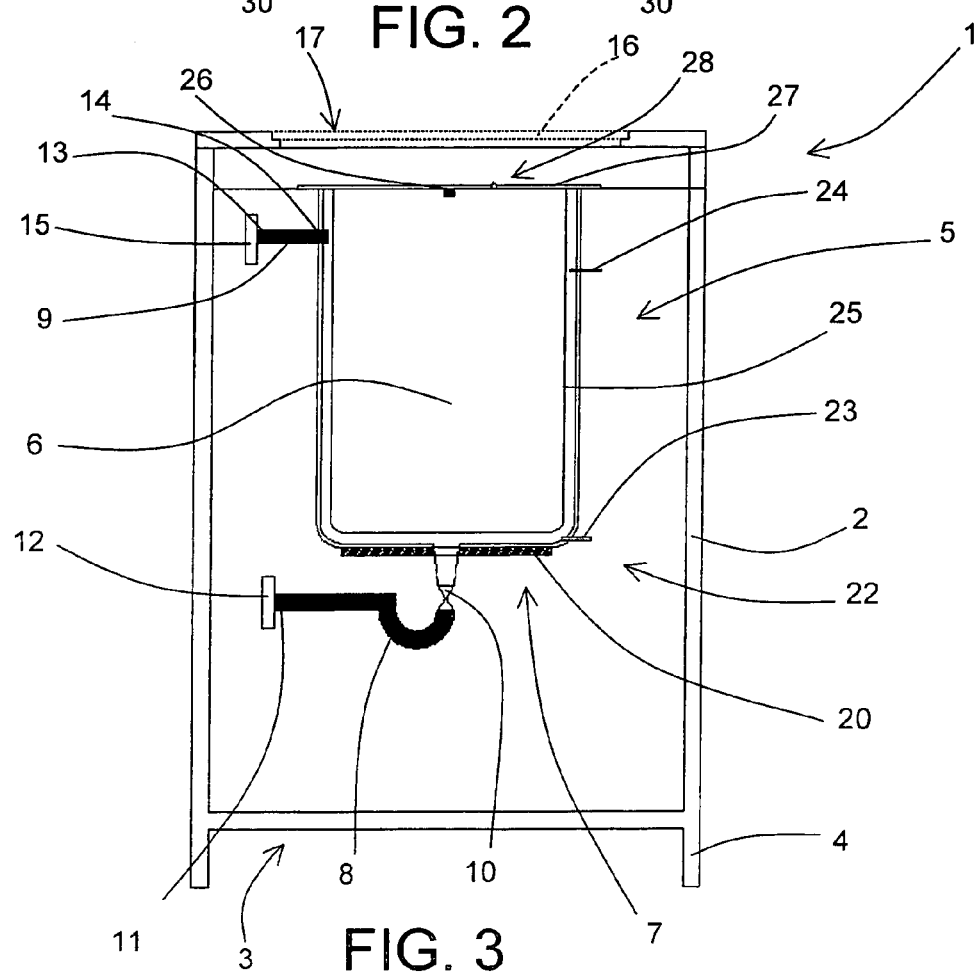
FIG. 3 shows a schematic front view of the furniture item of FIG. 1, with some parts drawn in see-through mode and others removed.

In the embodiments of FIGS. 3 and 5, the cooking device 5 is provided with a lower electrical plate 20 inferiorly associated to the cooking tank 6.

Figure 4:
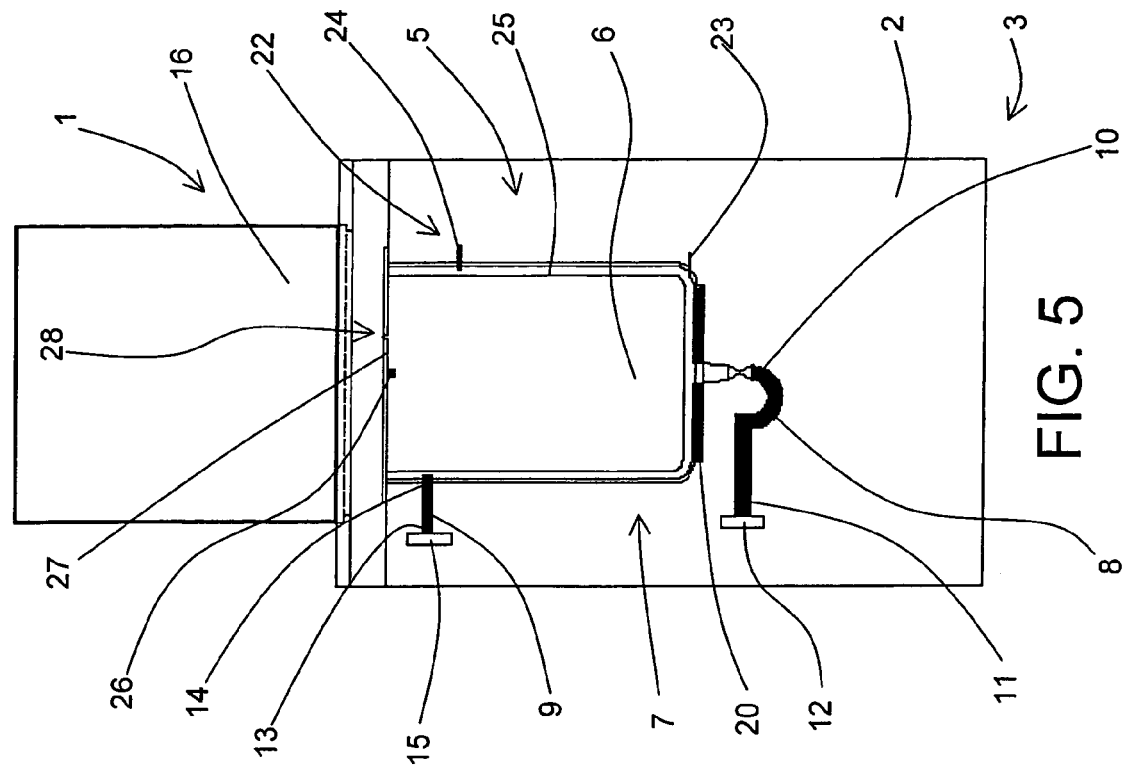
FIG. 4 shows a schematic front view, with some parts drawn in see-through mode and others removed, of a first variation of the kitchen furniture item obtained in accordance with the present invention.

In the embodiment of FIG. 4, instead, the cooking device 5 is provided with a lateral electrical plate 21 laterally associated to the tank 6. Instead of the lateral electrical plate 21, electrical coils may be provided.

Under certain circumstances, both the lower electrical plate 20 and the lateral electrical plate 21 (or the electrical coils) may be provided. The cooking device 5 is preferably provided with means 22 for sensing the level of the water contained in the cooking tank 6, which in the illustrated embodiments comprise a minimum level sensor 23 mounted in proximity to the bottom of the cooking tank 6, to sense when the water contained in the tank 6 drops below the minimum allowed level, and a maximum level sensor 24 mounted laterally to the cooking tank 6 in proximity to its top, to sense when the water contained in the tank 6 reaches the maximum allowed level.

In a more complex embodiment (not shown), the sensing means 22 comprise a sensor able to measure with good precision the level of water in the tank 6, whilst the lateral electrical plate 21 is subdivided into a plurality of superposed modules, able to be operated independently. The cooking device 5 further comprises control means to command the operation of the heating modules according to the level of the water measured by the sensing means 22, according to the procedures described below.

The cooking device 5 can further comprise at least a holed basked 25 removably inserted in the tank 6 to contain food to be cooked and which, once cooking is completed, can be used as a colander. For this purpose the basket 25 is provided with a handle 26.

Advantageously, the cooking device also comprises a lid 27 superiorly associated to the tank 6, which can also be made of an appropriate transparent material.

In a first embodiment (FIG. 1), the lid 27 is associated to the tank 6 by means of sliding guides (not shown), and it can slide from a closure position of the tank 6, in correspondence with which it closed in substantially hermetic fashion the tank 6, to an open position in which it is laterally translated relative to the tank 6 and it allows access thereto.

In a second embodiment (FIG. 4), the lid 27 is hinged to the support structure 2 and, in the open position, it lies in a vertical plane (drawn in dashed lines in FIG. 4). Moreover, depending on the embodiment, the lid 27 can be opened and closed manually or in automated fashion.

Advantageously, the lid 27 is provided with a safety valve 28, appropriately calibrated, for protection against excessive overpressures which may occur inside the cooking tank 6 itself.

Lastly, in the preferred embodiment of the present invention, the kitchen furniture item 1 further comprises an electronic unit (not shown) for controlling the various active elements which comprise it. In particular, the control unit can control the operation of the cooking device 5 being connected to the means 22 for sensing the water level, as well as to the heating means 7 and to the shut-off valves (which may advantageously be constituted by solenoid valves). moreover the control unit may control the position of the lid 27, and be connected to the control push-button 18 and to the means for actuating the covering element 16.

In the illustrated embodiments, control over the operation of the kitchen furniture item 1 is exercised by a user through a control panel 29 in which are grouped a plurality of controls 30 operatively connected to the electronic unit.

In particular, the following can be provided: a control for the operation of each solenoid valve; a control for the operation of the heating means 7; a control for regulating the quantity of heat generated by the heating means 7; a control for opening the lid 27 (if it is capable of automated opening); a timer; a water temperature display (in which case the cooking device 5 will obviously be provided with an appropriate temperature measuring device); etc.

In the embodiments in which the lateral plate is subdivided into multiple superposed independent modules, the electronic unit also controls the operation of the modules, in such a way as to activate only those located below the level of the water.

The operation of the present invention is as follows.

First of all, manually or through the appropriate push-button 18, the user opens the covering element 16.

After ensuring that the second valve 15, associated to the drain conduit 8, is shut, the user commands the opening of the first valve 10 and fills the tank 10 with water up to the desired level.

Subsequently, the users activates the heating means 7 and brings the water to the desired temperature (which the user can monitor by means of the temperature display).

The food can then be cooked in traditional fashion also with reference to use of the lid 27 and of the timers, if present.

When cooking is complete, the user can, at his/her discretion, either operate the second shut-off valve 15 to drain the water, leaving the food in the holed basket 25, or extract the holed basket 25.

The last step is the closure of the covering element 16 to recompose the upper support plane 17, hiding the cooking device 5 from view.

The present invention achieves important advantages.

In the first place the kitchen furniture item for cooking foods of the present invention allows rapidly to complete the cooking of even large quantities of food thanks to the heating means incorporate in the furniture item itself and dimensioned to suit the size of the tank.

In the second place, said kitchen furniture item avoids the need to have available large pots which are a considerable element of bulk, for which cleaning operations are particularly difficult.

Once the cooking operation is completed, cleaning the tank is very simple thanks to the inlet conduit and to the drain conduit.

It should also be noted that the present invention is relatively easy to construct and that the cost connected with the embodiment of the invention is not very high.

The invention thus conceived can be subject to numerous modifications and variations, without thereby departing from the scope of the inventive concept that characterises it.

All details can be replaced with other, technically equivalent, elements and in practice all materials employed, as well as the shapes and dimensions of the various components, can be any depending on requirements.

What is claimed is:

1. A kitchen appliance for cooking foods formed as a base unit for use with other similarly sized base units in a kitchen, comprising a support structure (2) having a lower support base (3), and a cooking device (5) mounted in correspondence with an upper operative portion of said support structure (2), characterised in that said cooking device (5) comprises:
   a cooking tank (6);
   a water inlet conduit (9) having a first end (13) that is connectable to a water supply system and a second end (14) connected to said tank (6) for pouring water on command into said cooking tank (6);
   a drain conduit (8) connected to a bottom of said tank (6) by means of a first shut-off valve (10) and connectable to a drain system, to discharge on command the contents of said tank (6); and
   heating means (7) operatively associated to said tank (6) to heat contents of the tank on command;
   said kitchen appliance (1) further comprising at least a covering element (16) engaged over said support structure (2) and movable from an open position allowing access to said cooking device (5), to a closed position covering said cooking device (5) and defining a lateral support plane (17) of the base unit above said support structure.

2. The kitchen appliance as claimed in claim 1, characterised in that said cooking device (5) further comprises a second shut-off valve (15) positioned along said inlet conduit (9).

3. The kitchen appliance as claimed in claim 1, characterised in that said cooking device (5) further comprises at least a holed basket (25) removably inserted in said tank (6) to contain food to be cooked.

4. The kitchen appliance as claimed in claim 1, characterised in that said heating means (7) comprise a lower electrical plate (20) inferiorly associated to said cooking tank (6).

5. The kitchen appliance as claimed in claim 1, characterised in that said heating means (7) comprise a lateral electrical plate (21) or at least an electrical coil laterally associated to said tank (6).

6. The kitchen appliance as claimed in claim 1, characterised in that said cooking device (5) further comprises means (22) for sensing the level of the water contained in said cooking tank (6).

7. The kitchen appliance as claimed in claim 6, characterised in that said sensing means (22) comprises a minimum level sensor (23) mounted in proximity to the bottom of said cooking tank (6), to sense when the water contained in said tank (6) drops below a minimum level.

8. The kitchen appliance as claimed in claim 6, characterised in that said sensing means (22) comprise a maximum level sensor (24) mounted laterally to said cooking tank (6), to sense when the water contained in said tank (6) reaches a maximum allowed level.

9. The kitchen appliance as claimed in claim 5, characterised in that said cooking device (5) further comprises means (22) for sensing the level of the water contained in said cooking tank (6), in that said lateral electrical plate (21) is subdivided into a plurality of superposed modules which can be operated independently, and in that it further comprises control means for commanding the operation of said modules according to the water level sensed by said sensing means (22).

10. The kitchen appliance as claimed in claim 1, characterised in that said cooking device (5) further comprises a lid (27) superiorly associated to said tank (6).

11. The kitchen appliance as claimed in claim 10, characterised in that said lid (27) is associated to said tank (6) by means of sliding guides and can slide from a position of closure of the tank (6) in correspondence with which it closes the tank (6) in substantially hermetic fashion, to an open position in which it is translated laterally relative to the tank (6) and it allows access thereto.

12. The kitchen appliance as claimed in claim 10, characterised in that said lid (27) is hinged to said support structure (2) and is movable from a closure position of the tank (6) in correspondence with which it closes the tank (6) in substantially hermetic fashion, to an open position in which it allows access to the tank (6).

13. The kitchen appliance as claimed in claim 10, characterised in that said lid (27) is further provided with a safety valve (28) against excessive overpressures which may occur in said cooking tank (6).

14. The kitchen appliance as claimed in claim 1, characterised in that said covering element (16) is associated in sliding fashion to said support structure (2) and can slide in a horizontal plane.

15. The kitchen appliance as claimed in claim 1 characterised in that said covering element (16) is hinged to said support structure (2).

16. The kitchen appliance as claimed in claim 1 characterised in that said covering element (16) is in the form of a roller shutter.

17. The kitchen appliance as claimed in claim 1, characterised in that said covering element (16) is in the form of a bellows.

18. The kitchen appliance as claimed in claim 1, characterised in that it further comprises an electronic unit for controlling the different elements of said cooking device (5).

19. The kitchen appliance as claimed in claim 18 characterised in that it further comprises a plurality of controls (30) operatively connected to said electronic unit to command the operation of the cooking device (5).

20. The kitchen appliance as claimed in claim 19 characterised in that said electronic unit also controls the automatic actuation of said covering element (16).

* * * * *